(No Model.)

F. L. PERRY.
TWO WHEELED VEHICLE.

No. 439,681. Patented Nov. 4, 1890.

Witnesses
G. F. Downing
S. G. Nottingham

Inventor
Francis L. Perry.
By his Attorneys
H. A. Surmon

UNITED STATES PATENT OFFICE.

FRANCIS L. PERRY, OF BROOKLYN, NEW YORK.

TWO-WHEELED VEHICLE.

SPECIFICATION forming part of Letters Patent No. 439,681, dated November 4, 1890.

Application filed November 25, 1889. Serial No. 331,536. (No model.)

*To all whom it may concern:*

Be it known that I, FRANCIS L. PERRY, of Brooklyn, in the county of Queens and State of New York, have invented certain new and useful Improvements in Two-Wheeled Vehicles; and I do hereby declare the following to be a full, clear, and exact description of the invention, such as will enable others skilled in the art to which it appertains to make and use the same.

My invention relates to an improvement in two-wheeled vehicles, the object being to greatly reduce the number and complicity of parts and produce an inexpensive and easy-riding vehicle not liable to get out of order or become broken.

With this end in view my invention consists in certain novel features of construction and combinations of parts, as will be hereinafter described, and pointed out in the claims.

Figure 1:
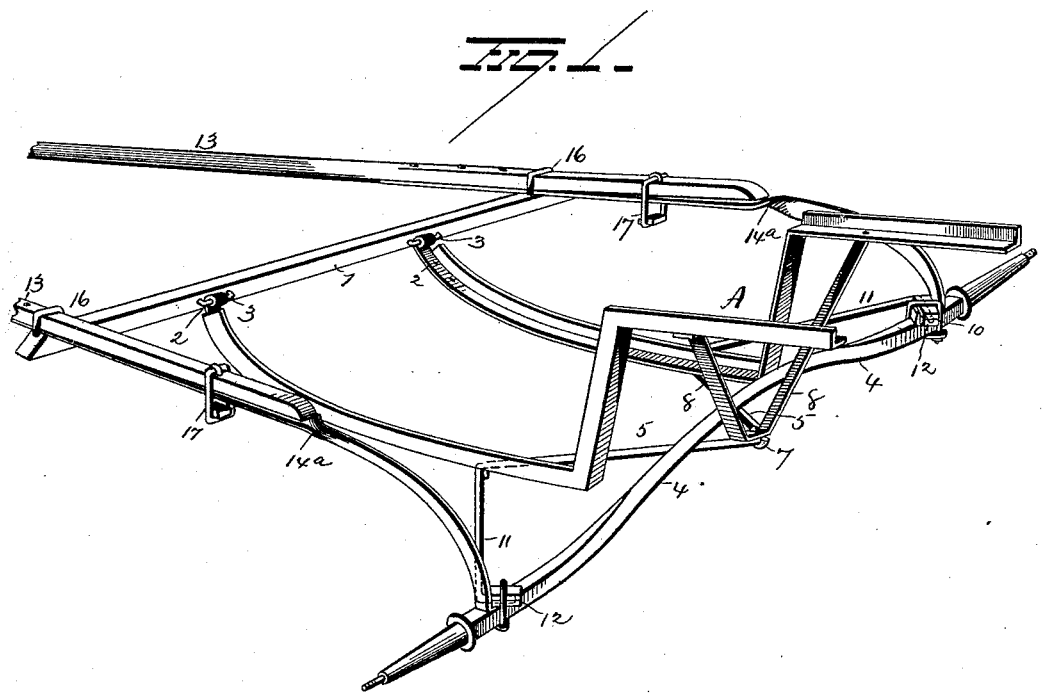
Figure 2:
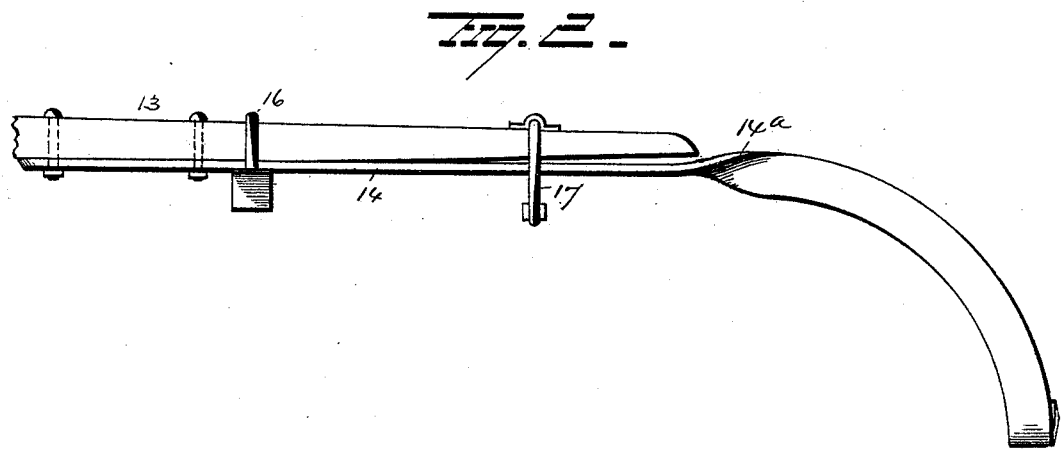

In the accompanying drawings, Figure 1 is a side elevation, and Fig. 2 is a view in side elevation of the shaft.

A represents the body of the vehicle. It is hung at its forward end to the cross-bar 1 by straps 2 2 and staples 3 3 or by other similar devices, so as to permit free movement at this point of support. The rear end of the body extends over the axle 4, and as the latter is preferably arched at the center the body of the vehicle is cut out at this point to allow free vertical movement due to the action of the springs. Different forms of springs may be employed; but the one I particularly prefer to employ with this style of vehicle is a W-shaped spring 5, as shown in Fig. 1. This spring has three points of connection with the body, two forward of the axle by loops 6 6 or their equivalents, and another by means of a loop, hook-swivel 7, or their equivalents to the depending V-shaped bracket or hanger 8 on the other side of the axle, to which point the central or V-shaped portion of the spring extends, crossing beneath the arch of the axle. Thus in this connection it may be mentioned that the axle is entirely surrounded by parts of the vehicle, so that in case any of the parts give away, unless the axle itself breaks, the body is always caught, and the occupants are not let down to the ground.

To return again to the W-shaped spring, it is furnished at its outer ends with pintles 10 10, which preferably extend at about right angles to the outer arms 11 11 of the spring. These pintles extend obliquely over the axle, where they are held in bearing-boxes 12 12, sectional or otherwise, clipped or otherwise secured near the outer ends of the axle, where, it may be mentioned, almost the entire weight of the body and the occupant of the vehicle is sustained, these being the only points of support, and these over or nearly over the wheels, so that practically no strain is brought to bear on the cutter of the axle or upon the forward or rear end of the body. The object of this oblique connection is to prevent any rocking or swinging of the axle and yet to allow the pintles free rocking motion within the boxes.

The shafts, preferably, consist of the usual wooden outer ends 13 13, between which the draft-animal is harnessed, and the metal rear ends 14 14, which extend back to the axle and extend some distance beneath the rear ends of the wooden portion, and the two parts are secured together at some point preferably forward of the cross-bar 1. The metal portion of the shafts consists of a narrow strip bent at point 14$^a$, where the rear end of the wooden portion terminates into two planes at right angles to each other, so that the forward end, which lies beneath the wooden portion of the shaft is flat, giving ample yielding capacity, while the curved rear end of the metal portion which extends downward to the axle is in a vertical plane, giving to it the opposite effect, or, in other words, making it rigid and unyielding, so that the axle is prevented from rocking, as it would if this bent end were allowed to yield. A loop or similar device 16 embraces the two parts of the shafts and holds them to the cross-bar, whereas the rear end is permitted to have a limited free movement defined by the loop 17, which hangs from the end of the wooden part of the shaft. This only comes into play when the weight is back of the axle, and it prevents the body from tipping too far back, and at the same time prevents the shafts from flying up. To avoid the noise which might result from this loop striking the metal portion of the shafts, rubber or other padding may be placed in it.

The rear ends of the shafts may be bent laterally, as shown, and extend beneath the bearing-boxes and then be held by the same clip which holds the box, or they may be secured at one side of the box separately.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a two-wheeled vehicle, the combination, with shafts, an axle, and a body, of a spring connected at its ends and projecting forwardly and inwardly therefrom on its opposite sides and then rearwardly and inwardly to a point behind the axle, the said body being connected to the spring at points in front of and behind the axle, substantially as set forth.

2. In a two-wheeled vehicle, the combination, with shafts, a cross-bar, and a body hinged to the cross-bar, of an axle, a bracket depending in the rear of the axle, and a W-shaped spring having loose connection with the body and the bracket, and having bearing at its outer ends in boxes or similar devices secured to the axle, substantially as set forth.

3. The combination, with a body, axle, and spring, of a pair of shafts composed of wood and metal overlapping each other and rigidly secured together at or near the front ends of the metal sections and loosely connected at or near the rear ends of the wood sections, the said metal sections being rectangular in cross-section and attached to the axle at their rear ends and twisted at points in advance of the axle so as to bring the broader surfaces of the strips in front of the twists in planes at right angles to the planes of the broader surfaces at points behind said twists, substantially as set forth.

4. In a two-wheeled vehicle, the combination, with an axle and shafts, of spring-extensions rigidly secured to the shafts some distance from their rear ends and extending beneath the latter from the point of attachment for some distance beyond the ends of the shafts and loops pivotally connected with the rear ends of the shafts and encircling the spring-extensions, substantially as set forth.

5. The combination, with an axle, a body, and a W-shaped spring connected to the body and axle, of shafts composed of wood and metal, the metal portion being rectangular in cross-section and rigidly secured to the wooden portion at one end and yieldingly connected to the wooden portion at or near the rear end of the latter, the metal portion of the shafts having a twist immediately at the rear of the wooden portions, so that the part secured to the wooden shaft is horizontal and the other portion vertical, substantially as set forth.

6. The combination, with a cross-bar, a body hinged thereto, an axle, and spring connecting the body yieldingly with the axle, of a pair of shafts consisting of wooden and metal strips, the latter being rectangular in cross-section and rigidly secured at their forward ends to the wooden sections of the shafts and clipped or otherwise secured to the axle at their rear ends, the said metal portions being twisted at points behind the rear ends of the wooden sections, so as to bring the broader surfaces of the portions thereon behind the bends in planes at right angles to the planes of the broader surfaces thereof in front of the bends, loops depending from the rear ends of the wooden portion of the shafts and surrounding the metal portion, and loops or clips connecting these parts to the cross-bar, substantially as set forth.

7. The combination, with a body and axle, of shafts, each consisting of wooden sections and metal sections, the latter being rigidly secured at their forward ends to the wooden sections and loosely connected to said wooden sections at or near the rear ends of the latter, the rear ends of said metal sections being bent laterally and upward and clipped to the axle, substantially as set forth.

In testimony whereof I have signed this specification in the presence of two subscribing witnesses.

FRANCIS L. PERRY.

Witnesses:
S. G. NOTTINGHAM,
G. F. DOWNING.